(12) United States Patent
Wu et al.

(10) Patent No.: US 7,455,885 B2
(45) Date of Patent: Nov. 25, 2008

(54) SELECTIVE AREA GROWTH CARBON NANOTUBES BY METAL IMPRINT METHOD

(75) Inventors: YewChung Sermon Wu, Taichung (TW); Chi Wei Chao, Taipei (TW); Chih Yuan Hou, Chiai (TW)

(73) Assignee: National Chiao Tung University, Hsinchu (TW)

( * ) Notice: Subject to any disclaimer, the term of this patent is extended or adjusted under 35 U.S.C. 154(b) by 210 days.

(21) Appl. No.: 11/402,528

(22) Filed: Apr. 11, 2006

(65) Prior Publication Data

US 2007/0026565 A1    Feb. 1, 2007

Related U.S. Application Data

(63) Continuation of application No. 10/632,472, filed on Aug. 1, 2003, now abandoned.

(30) Foreign Application Priority Data

Mar. 6, 2003    (TW) .............................. 92104868 A

(51) Int. Cl.
*B05D 3/00*    (2006.01)

(52) U.S. Cl. ...................... 427/264; 427/301; 977/742; 977/842; 977/888

(58) Field of Classification Search ....................... None
See application file for complete search history.

(56) References Cited

U.S. PATENT DOCUMENTS

| 6,060,121 | A  | * | 5/2000  | Hidber et al. ............... 427/261 |
| 6,350,488 | B1 |   | 2/2002  | Lee et al. |
| 6,946,851 | B2 | * | 9/2005  | Lee et al. ..................... 324/658 |
| 6,960,528 | B2 |   | 11/2005 | Chen et al. |

OTHER PUBLICATIONS

Office Action dated Jan. 12, 2006 in U.S. Appl. No. 10/632,472.

* cited by examiner

*Primary Examiner*—William P Fletcher, III

(57) ABSTRACT

Manufacturing methods of using a metal imprint technique for growing carbon nanotubes on selective areas and the structures formed thereof are provided. One of the manufacturing methods includes steps of forming a first substrate with tapered structures applied with a metal catalyst, imprinting a second substrate on the first substrate for being a growth substrate, and growing carbon nanotubes on the growth substrate. The other manufacturing method includes steps of forming a first substrate with tapered structures, imprinting the first substrate on a second substrate applied with a metal catalyst for forming a second growth substrate, and growing carbon nanotubes on the second grown substrate. And, the formed structures of the present invention include a substrate, plural carbon nanotubes, and plural imprinted vestiges.

14 Claims, 6 Drawing Sheets

SELECTIVE AREA GROWTH CARBON NANOTUBES BY METAL IMPRINT METHOD

CROSS-REFERENCE TO PRIOR APPLICATIONS

This application is a continuation of U.S. application Ser. No. 10/632,472, filed on Aug. 1, 2003 now abandoned, entitled "SELECTIVE AREA GROWTH OF CARBON NANOTUBES BY METAL IMPRINT METHOD" now abandoned, which in turn claims priority from Patent Application 092104868 filed Mar. 6,2003, in Taiwan ROC.

Incorporated by reference herein in its entirety is U.S. application Ser. No. 10/632,472, including a certified copy of Taiwanese Application 092104868 contained in the file history of U.S. application Ser. No. 10/632,472.

FIELD OF THE INVENTION

This invention relates to a method for growing carbon nanotubes on selective areas and the formed structures thereof, and particularly to a method for growing carbon nanotubes on selective areas by a metal imprint technique and the formed structures thereof.

BACKGROUND OF THE INVENTION

A carbon nanotube (CNT) is a tubular material formed by rolling up a graphite piece. The structure can be divided into two forms, the single-walled type and the multi-walled type. Since the carbon nanotube has been discovered, it is found having the properties of high aspect ratio, small curvature radius at the sharp structure, high tensile strength, great heat conductivity, good super-conductivity at room temperature, and high chemical stability. Furthermore, the conductivity of CNT can easily be changed when CNT is made into nano-line or nano-semiconductor by various rolling-up means. Therefore, CNT has become the most popular research object for the scientists recently.

Nowadays, the methods for manufacturing carbon nanotubes include the arc-discharge method, the laser ablation method, the chemical vapor deposition method, and the organic metal pyrolysis method. The carbon nanotubes made by the respective method described above are all different. For example, the carbon nanotube can either be formed with a diameter ranged from one to hundreds of nanometers or be formed with a length ranged from hundreds of nanometers to hundreds of millimeters. Due to the carbon nanotube has the properties of compact volume, high strength, great heat conductivity and high electricity conductivity, and low power-consuming, it has been thought as the superior materials for developing various application products at the nanometer-level. For instance, the carbon nanotube can be used for manufacturing a transistor. In which, the carbon nanotube can be used as the electric current channel and the intensity of the electricity fields effecting on the carbon nanotube are changed by inputting various gate voltages. Accordingly, the transistor can be turned on or turned off simply by controlling the width of the current channel. Furthermore, the carbon nanotubes can also be applied to the manufacture of the field emission display and the probe for the atomic force microscopy. The resolution of the atomic force microscopy will be substantially improved by the probe made of the carbon nanotubes.

In the conventional method of manufacturing a carbon nanotube, it does not matter whether the finished products of carbon nanotubes are two-dimension or three-dimension structures, each carbon nanotube is usually a web structure with similar diameter. During the manufacturing process, a few components are including are necessarily provided in advance, including at least a substrate, a metal powder, and a reagent gas containing a carbon. Next, the reaction is performed under high temperature, and then the carbon nanotubes are grown and formed from the plural concaves on the substrate mentioned early. In the conventional method, the carbon nanotubes are usually grown without controlling their directions and densities. However, the directions and densities of the formed carbon nanotubes will affect the efficiency and the prime cost of the relative products. The product made of carbon nanotubes having one single direction will have a more complete structure, a better heat conductivity and a better electricity conductivity. Contrarily, the product made of carbon nanotubes without one single direction will not reveal the properties of great heat conductivity and high electricity conductivity as they are supposed to reveal. Furthermore, if the density of the carbon nanotubes is not high enough, the corresponding product will not fully reveal the excellent properties of the carbon nanotubes, such as great heat conductivity and high electricity conductivity, and high tensile intensity. Oppositely, if the density of the carbon nanotubes is too high, the corresponding high production costs will be wasted meaninglessly.

As above-mentioned, a method for controlling the manufactured carbon nanotubes on selective areas with a desired growing direction and a desired density will have great utility in the relevant industries.

Because of the technical defects described above, the applicant keeps on carving unflaggingly to develop a "SELECTIVE AREA GROWTH OF CARBON NANOTUBES BY METAL IMPRINT METHOD" through wholehearted experience and research.

SUMMARY OF THE INVENTION

It is an object of the present invention to provide a method for manufacturing carbon nanotubes on selective areas for controlling the densities of the manufactured carbon nanotubes.

It is another object of the present invention to provide a method for manufacturing carbon nanotubes having a desired direction for improving the relevant heat and electricity conductivities of the related products.

It is another object of the present invention to provide a carbon nanotube structure having a more complete structure and a higher tensile intensity.

In accordance with one aspect of the present invention, a method for growing a plurality of carbon nanotubes on a selective area is provided. The method includes steps of: step a) forming a first masking layer on a first substrate, step b) photolithographing the first masking layer for forming a plurality of specific areas on the first substrate, step c) etching the plurality of specific areas for forming a second masking layer on the first substrate, step d) etching the second masking layer and the first substrate for forming a plurality of tapered structures, step e) applying a catalyst on the plurality of tapered structures, step f) imprinting a second substrate on the first substrate having the catalyst thereon for being a growth substrate with a plurality of vestiges of the catalyst, and step g) growing the plurality of carbon nanotubes on the growth substrate.

Preferably, both the first substrate and the second substrate are silicon substrates.

Preferably, the first masking layer is a first silicon oxide masking layer formed at a temperature ranged from 800 to 1200° C. and has a thickness ranged from 2000 to 7000 Å.

Preferably, the step c) is performed by a BOE (Buffer Oxide Etching) solution containing a hydrofluoric acid.

Preferably, the step d) is performed by a chemical solution containing a potassium hydroxide.

Preferably, the step e) is performed by a physical deposition method.

Preferably, the second masking layer is formed just on the plurality of specific areas.

Preferably, the plurality of tapered structures are a plurality of sharp silicon structures.

Preferably, the step b) further includes step 1) providing a mask, step b2) forming a first photoresist layer on the first masking layer, and step b3) etching the first photoresist layer with the mask for forming a second photoresist layer.

Preferably, the second masking layer includes the second photoresist layer and a second silicon oxide masking layer.

Preferably, the step c) further includes a step c1) removing the second photoresist layer by an acetone.

Preferably, the catalyst is a metal catalyst selected from a group consisting of a ferrum, a cobalt, and a nickel.

Preferably, each of the plurality of vestiges of the catalyst has a diameter ranged from 10 to 200 nanometers.

Preferably, each of the plurality of vestiges of the catalyst introduces a growth of each of the carbon nanotubes.

In accordance with another aspect of the present invention, a method for growing a plurality of carbon nanotubes on a selective area is provided. The method includes steps of: step a) forming a first masking layer on a first substrate, step b) photolithographing the first masking layer for forming a plurality of specific areas on the first substrate, step c) etching the plurality of specific areas for forming a second masking layer on the first substrate, step d) etching the second masking layer and the first substrate for forming a plurality of tapered structures on the first substrate, step e) applying a catalyst on a second substrate, step f) imprinting the first substrate on the second substrate for respectively obtaining a residuum on a tip of each of the plurality of tapered structures, and step g) respectively growing each of the carbon nanotubes on each of the plurality of tapered structures having the residuum.

Preferably, the catalyst is a metal catalyst selected from a group consisting of a ferrum, a cobalt, and a nickel.

Preferably, the step b) further includes steps of step b1) providing a mask, step b2) forming a first photoresist layer on the first masking layer, and step b3) etching the first photoresist layer with the mask for forming a second photoresist layer.

In accordance with another aspect of the present invention, a method for growing a plurality of carbon nanotubes is provided. The method includes steps of: step a) providing a first substrate having a plurality of tapered structures, step b) applying a catalyst on the plurality of tapered structures, step c) imprinting a second substrate on the first substrate for obtaining a plurality of vestiges of the catalyst on the second substrate, and step d) growing the plurality of carbon nanotubes on the plurality of vestiges.

Preferably, the catalyst is a metal catalyst selected from a group consisting of a ferrum, a cobalt, and a nickel.

In accordance with another aspect of the present invention, a carbon nanotube structure is provided. The structure includes a silicon substrate, at least an imprinted vestige deposited on the silicon substrate, and at least a carbon nanotube grown on the imprinted vestige.

Preferably, the imprinted vestige is formed by a metal imprint technique.

In accordance with another aspect of the present invention, a carbon nanotube structure is provided. The structure includes a silicon substrate with a plurality of tapered structures, and a plurality of carbon nanotubes respectively grown on a tip of each of the plurality of tapered structures.

Preferably, the plurality of carbon nanotubes are grown along a same direction.

Preferably, the plurality of tapered structures are formed by steps of a photolithography, a first etching, and a second etching.

Preferably, the plurality of carbon nanotubes are introduced to grow by a metal catalyst.

The foregoing and other features and advantages of the present invention will be clearly understood through the following descriptions with reference to the drawings, wherein:

DETAILED DESCRIPTION OF THE PREFERRED EMBODIMENT

Figure 1:
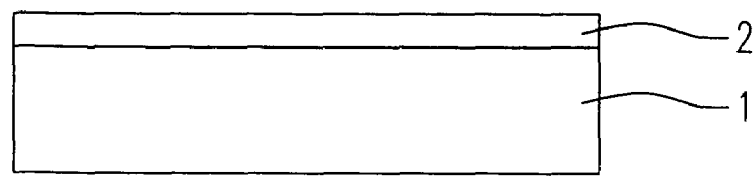
FIG. 1 is the schematic diagram illustrating the silicon substrate coated with the silicon oxide masking layer thereon according to a preferred embodiment of the present invention.

The present invention will now be described more specifically with reference to the following embodiments. Please refer to FIG. 1, which is a schematic diagram illustrating the silicon substrate coated with the silicon oxide masking layer thereon according to a preferred embodiment of the present invention. As shown in FIG. 1, the silicon oxide masking layer 2 with a thickness of 5000 Å is formed on the first silicon substrate 1 under 1050° C. as an etching masking layer.

Figure 2A:
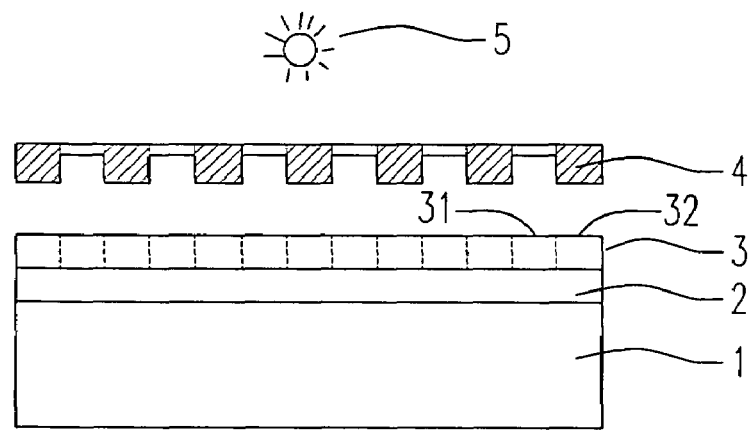
FIG. 2(a) is the schematic diagram illustrating the photolithography process according to a preferred embodiment of the present invention.
Figure 2B:
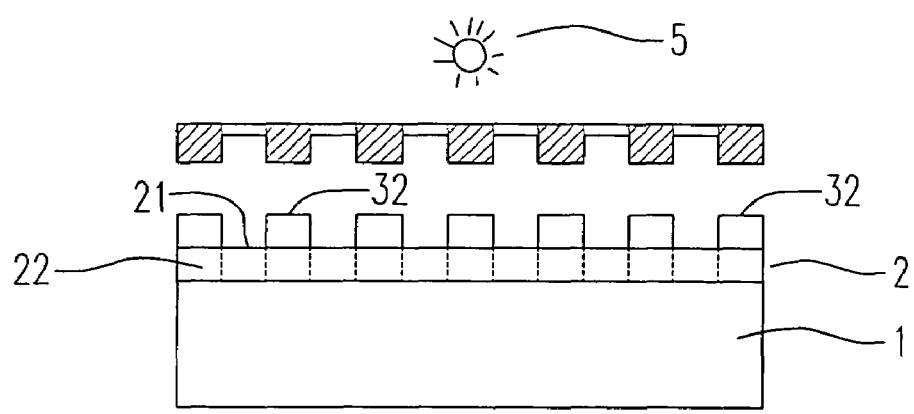
FIG. 2(b) is the schematic diagram illustrating the silicon oxide masking layer having the covered photoresist layer formed thereon according to a preferred embodiment of the present invention.

Please refer to FIGS. 2(a)~(b). FIG. 2(a) is a schematic diagram illustrating the photolithography process according to a preferred embodiment of the present invention. FIG. 2(b) is a schematic diagram illustrating the silicon oxide masking layer having the covered photoresist layer formed thereon according to a preferred embodiment of the present invention. As shown in FIG. 2(a), the photoresist layer 3 is coated on the silicon oxide masking layer 2. Then, the structure is exposed under the system having the light source 5 and the mask 4. Further, the photoresist layer 3 can be divided into the covered photoresist portion 32, which is sheltered from the mask 4, and the naked photoresist portion 31, which is not sheltered from the mask 4. The naked photoresist portion 31 will be decomposed via being exposed under the light source 5, and the decomposed result is shown in FIG. 2(b).

Figure 3:
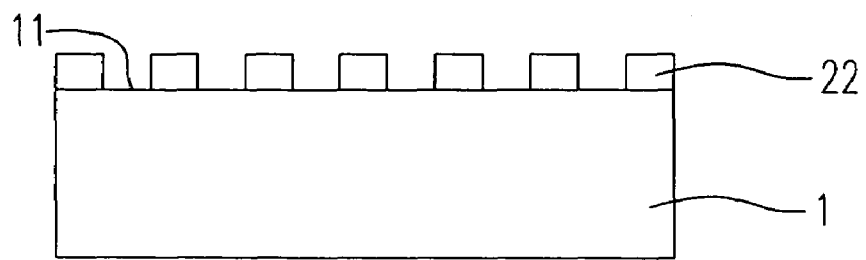
FIG. 3 is the schematic diagram illustrating the silicon substrate having the covered silicon oxide masking layer formed thereon according to a preferred embodiment of the present invention.

Please refer to FIGS. 2(b) and 3. FIG. 3 is the schematic diagram illustrating the silicon substrate having the covered silicon oxide masking layer formed thereon according to a preferred embodiment of the present invention. After the naked phototresis portion 31 is completely decomposed, a first etching is performed by a BOE (Buffer Oxide Etching) solution containing some hydrofluoric acid therein. At this moment, the naked silicon oxide masking portion 21, which is not sheltered by the covered photoresist portion 32, is etched by the BOE solution. On the other hand, the covered silicon oxide masking portion 22, which is sheltered by the covered photoresist portion 32, is remained. Then the covered photoresist portion 32 is etched and removed by the acetone solution. Therefore, the first silicon substrate 1 having the covered silicon oxide masking portion 22 formed thereon is accomplished, and the corresponding result is shown in FIG. 3.

Figure 4:
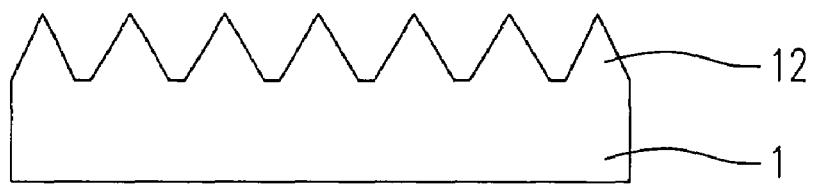
FIG. 4 is the schematic diagram illustrating the silicon substrate having the silicon sharp structure formed thereon according to a preferred embodiment of the present invention.

Please refer to FIGS. 3 to 4. FIG. 4 is a schematic diagram illustrating the silicon substrate having the sharp structures formed thereon according to a preferred embodiment of the present invention. After the above structure is accomplished, a chemical etching is then performed by the potassium hydroxide solution. Because the covered silicon oxide masking portion 22 has a better resistance to the potassium hydroxide solution than that of the first silicon substrate 1, the naked silicon substrate 11, which is not sheltered by the covered silicon oxide masking portion 22, will be etched and sunken downward continuously. After the silicon oxide masking portion 22 is completely etched, the chemical etching process will be stopped. At this moment, the first silicon substrate 1 having plural silicon sharp structures 12 is accomplished, and the corresponding result is shown in FIG. 4.

Figure 5:
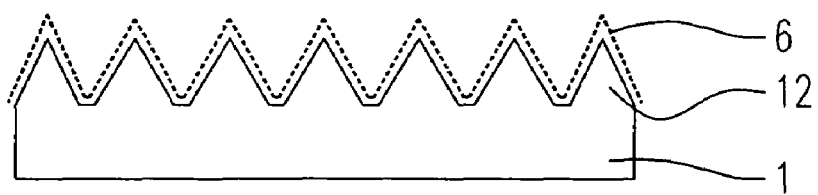
FIG. 5 is the schematic diagram illustrating the silicon sharp structure having the metal catalyst layer formed thereon according to a preferred embodiment of the present invention.

Please refer to FIGS. 4 to 5. FIG. 5 is a schematic diagram illustrating the silicon sharp structure having a metal catalyst layer formed thereon according to a preferred embodiment of the present invention. The first metal catalyst layer 6 is coated on the silicon sharp structures 12 of the first silicon substrate 1 by the physical vapor deposition method, and the corresponding result is shown in FIG. 5. In which, the first metal catalyst is selected from a group consisting of a ferrum, a cobalt, and a nickel.

Figure 6A:
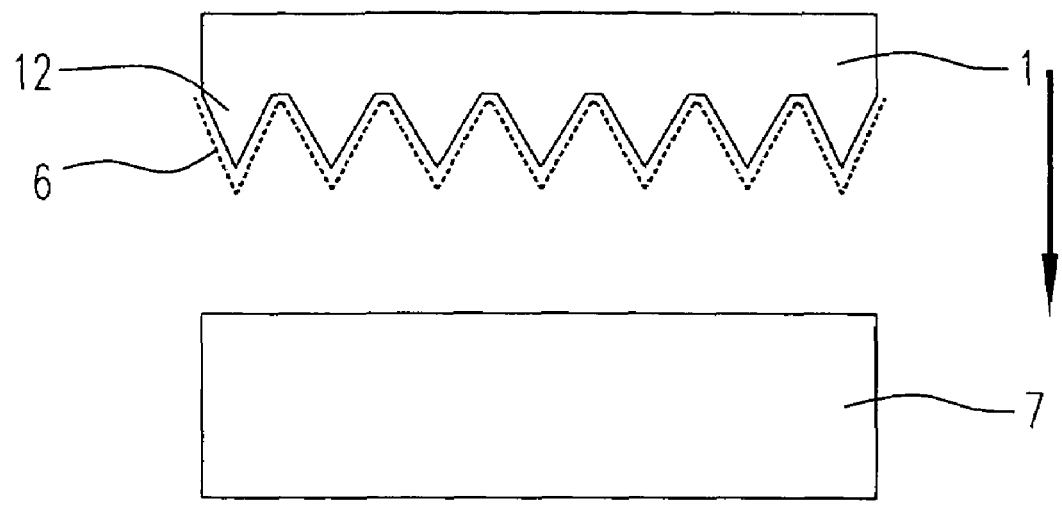
FIG. 6(a) is the schematic diagram illustrating the second silicon substrate is imprinted with the silicon sharp structure according to a preferred embodiment of the present invention.
Figure 6B:
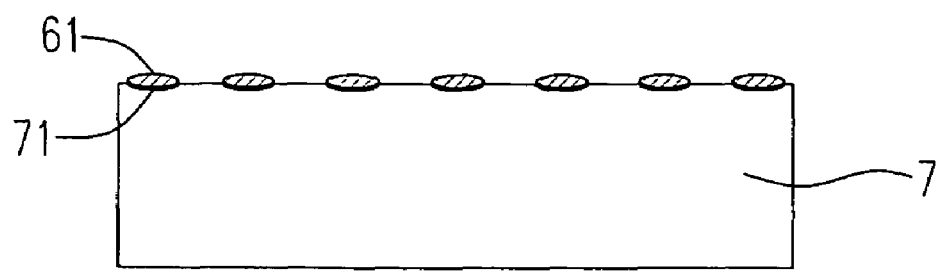
FIG. 6(b) is the schematic diagram illustrating the second silicon substrate having plural vestiges according to a preferred embodiment of the present invention.

Please refer to FIGS. 6(a)~(b). FIG. 6(a) is a schematic diagram illustrating a second silicon substrate imprinted with the silicon sharp structure according to a preferred embodiment of the present invention. FIG. 6(b) is a schematic diagram illustrating the second silicon substrate having plural vestiges according to a preferred embodiment of the present invention. As shown in FIG. 6(a), the second silicon substrate 7 is imprinted with the silicon sharp structures 12, and the corresponding result is shown in FIG. 6(b). As shown in FIG. 6(b), the second silicon substrate 7 will have plural the vestiges 71, and each vestige 71 has a metal catalyst ball 61 thereon. The diameter of the metal catalyst ball 61 is determined by the imprinting degree. Only when the diameter of the metal catalyst ball 61 is less than 200 nm, the manufacturing process of growing the carbon nanotubes will then be proceeded.

Figure 7:
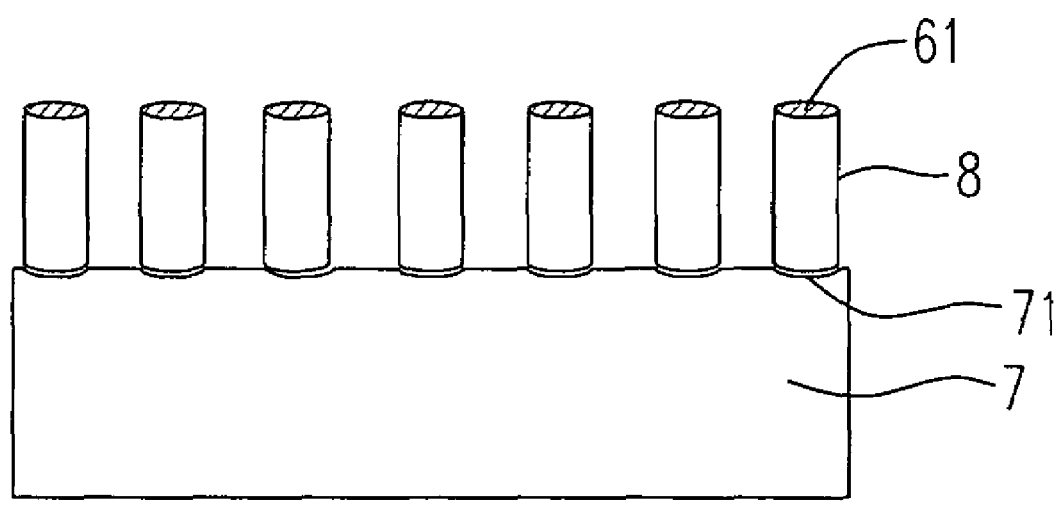
FIG. 7 is the schematic diagram illustrating the formation of the carbon nanotubes according to a preferred embodiment of the present invention.

Please refer to FIG. 7. FIG. 7 is a schematic diagram illustrating the formation of the carbon nanotubes according to a preferred embodiment of the present invention. As show in FIG. 7, the first carbon nanotubes 8 are grown from the vestiges 71 by catalyzing with the metal catalyst balls 61. In which, every single first carbon nanotube 8 is grown from every single one vestige 71, and all the grown carbon nanotubes 8 have the same direction. At this moment, a manufacturing process for growing single carbon nanotube on a selective area is accomplished, and all the grown carbon nanotubes have the same direction.

Figure 8A:
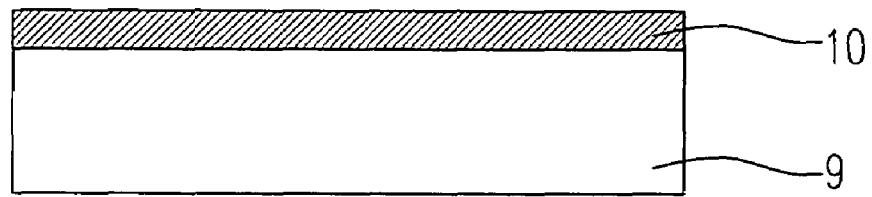
FIG. 8(a) is the schematic diagram illustrating the third silicon substrate having a metal catalyst layer formed thereon according to another preferred embodiment of the present invention.
Figure 8B:
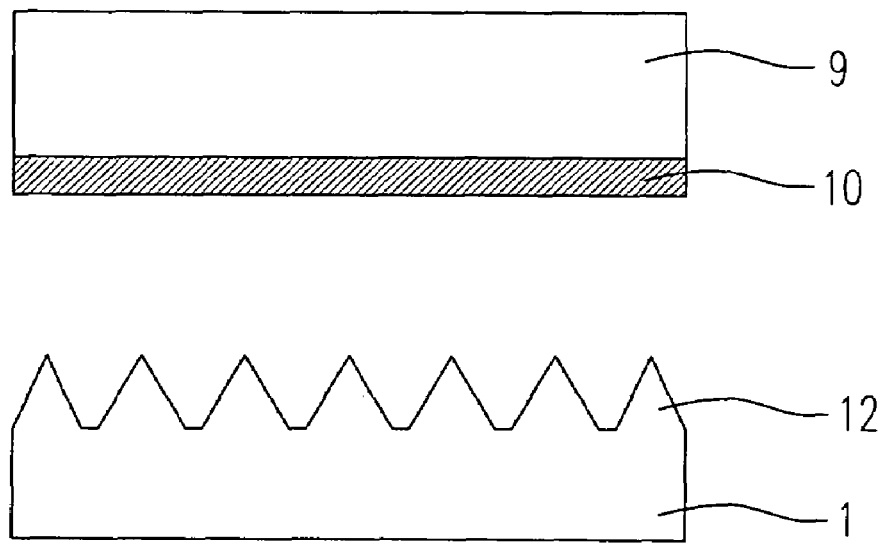
FIG. 8(b) is the schematic diagram illustrating the third silicon substrate having a metal catalyst layer formed thereon imprinted with the silicon sharp structure according to another preferred embodiment of the present invention.

Another preferred embodiment of the present invention is described as follows. Please refer to FIGS. 8(a)~(b). FIG. 8(a) is a schematic diagram illustrating the silicon substrate having a metal catalyst layer formed thereon according to another preferred embodiment of the present invention. FIG. 8(b) is a schematic diagram illustrating the third silicon substrate having a metal catalyst layer formed thereon imprinted by the silicon sharp structure according to another embodiment of the present invention. As shown in FIG. 8(a), the second metal catalyst layer 10 is coated on the third silicon substrate 9 by the physical vapor deposition method. In which, the second metal catalyst is selected from a group consisting of a ferrum, a cobalt, and a nickel.

Then, the silicon substrate 1 having the silicon sharp structure 12 (as shown in FIG. 4) is imprinted with the third silicon substrate 9, and the relevant imprinting method is shown in FIG. 8(b).

Figure 9:
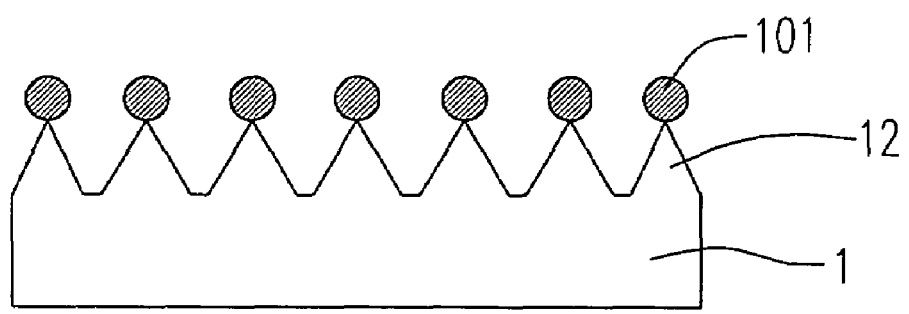
FIG. 9 is the schematic diagram illustrating the silicon sharp structure having a metal catalyst ball formed thereon according to another preferred embodiment of the present invention.

Please refer to FIG. 9. FIG. 9 is a schematic diagram illustrating the silicon sharp structure having the metal catalyst ball thereon according to another embodiment of the present invention. As shown in FIGS. 8(b) and 9, some metal residuum (second metal catalyst balls 101) are remained on the tips of the silicon sharp structure 12 after being imprinted with the second metal catalyst layer 10. The diameter of the metal catalyst ball 101 is determined by the imprinting degree. Only when the diameter of the metal catalyst ball 101 is less than 200 nm, the manufacturing process of growing the carbon nanotubes will be proceeded.

Figure 10:
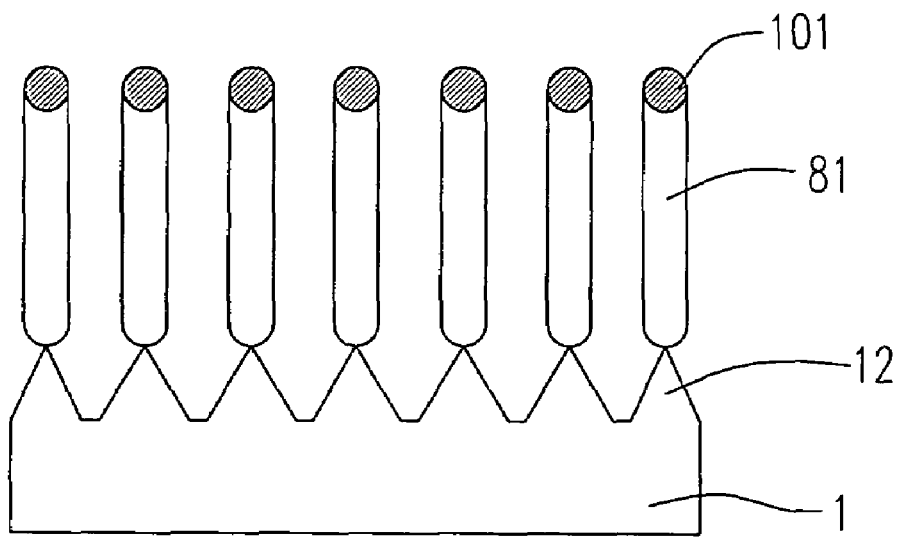
FIG. 10 is the schematic diagram illustrating the formation of the carbon nanotubes according to another preferred embodiment of the present invention.

Please refer to FIG. 10, which is the formation of the carbon nanotubes according to another embodiment of the present invention. As shown in FIG. 10, the second carbon nanotubes 81 are grown from the tip of the silicon sharp structures 12 by catalyzing with the metal catalyst balls 101. In which, every single second carbon nanotube 81 is grown from every single one silicon sharp structure 12, and all the grown carbon nanotubes 81 have the same direction. At this moment, another manufacturing process for growing single carbon nanotube on a selective area is accomplished and all the grown carbon nanotubes have the same direction.

As the above-mentioned description, since the sites for growing carbon nanotubes are decided by using the metal imprint technique, in the present invention, it is easy to control the densities, the growing directions, and the diameters of the grown carbon nanotubes. Furthermore, the present invention provides methods for growing carbon nanotubes having a desired density on the selective areas, so that it is possible to obtain the greatest benefits while considering the cost and the practical value. Additionally, the invention provides a manufacturing process for forming carbon nanotubes having the same direction, so that relevant products made of the carbon nanitubes will reveal the particular characteristics of the carbon nanotubes, such as great heat conductivity and high electricity conductivity. Therefore, the invention has originality, novelty and progressiveness. Thus, the present invention effectively improves the defaults of the prior arts and has utility for the industries.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for growing a plurality of carbon nanotubes on a selected area, comprising steps of:
   a) forming a first masking layer on a first substrate;
   b) photolithographing said first masking layer for forming a plurality of specific areas on said first substrate;
   c) etching said plurality of specific areas for forming a second masking layer on said first substrate;
   d) etching said second masking layer and said first substrate for forming a plurality of tapered structures on said first substrate;
   e) applying a catalyst on a second substrate;
   f) imprinting said first substrate on said second substrate for respectively obtaining a residuum on a tip of each of said plurality of tapered structures; and
   g) respectively growing each of said carbon nanotubes on each of said plurality of tapered structures having said residuum.

2. The method as claimed in claim 1, wherein said catalyst is a metal catalyst selected from the group consisting of a ferrum, a cobalt, and a nickel.

3. The method as claimed in claim 1, wherein said step b) further comprises steps of:
   b1) providing a mask;
   b2) forming a first photoresist layer on said first masking layer; and
   b3) etching said first photoresist layer with said mask for forming a second photoresist layer.

4. The method as claimed in claim 3, wherein said second masking layer comprises said second photoresist layer and a second silicon oxide masking layer.

5. The method as claimed in claim 4, wherein said step c) further comprises a step of c1) removing said second photoresist layer by an acetone.

6. The method as claimed in claim 1, wherein both said first substrate and said second substrate are silicon substrates.

7. The method as claimed in claim 1, wherein said first masking layer is a first silicon oxide masking layer formed at a temperature ranged from 800 to 1200° C. and has a thickness ranged from 2000 to 7000 Å.

8. The method as claimed in claim 1, wherein said step c) is performed by a BOE (Buffer Oxide Etching) solution containing a hydrofluoric acid.

9. The method as claimed in claim 1, wherein said step d) is performed by a chemical solution containing a potassium hydroxide.

10. The method as claimed in claim 1, wherein said step e) is performed by a physical deposition method.

11. The method as claimed in claim 1, wherein said second masking layer is formed just on said plurality of specific areas.

12. The method as claimed in claim 1, wherein said plurality of tapered structures are a plurality of sharp silicon structures.

13. The method as claimed in claim 1, wherein said residuum has a diameter ranged from 10 to 200 nanometers.

14. The method as claimed in claim 13, wherein said residuum introduces a growth of each of said carbon nanotubes.

* * * * *